United States Patent
Honishi et al.

(10) Patent No.: US 8,418,191 B2
(45) Date of Patent: Apr. 9, 2013

(54) APPLICATION FLOW CONTROL APPARATUS

(75) Inventors: Yoshitaka Honishi, Kawasaki (JP); Toshitaka Nagai, Kawasaki (JP); Toshiya Hanamori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1006 days.

(21) Appl. No.: 11/086,503

(22) Filed: Mar. 22, 2005

(65) Prior Publication Data

US 2006/0092834 A1    May 4, 2006

(30) Foreign Application Priority Data

Nov. 2, 2004    (JP) ................. 2004-319620

(51) Int. Cl.
*G06F 3/00*    (2006.01)
(52) U.S. Cl.
USPC ........................................ 719/313; 719/318
(58) Field of Classification Search ................. 719/313, 719/328, 314, 318
See application file for complete search history.

(56) References Cited

U.S. PATENT DOCUMENTS

| 5,504,896 | A  | * | 4/1996 | Schell et al. | 725/131 |
| 6,195,543 | B1 | * | 2/2001 | Granberg | 455/407 |
| 6,377,939 | B1 | * | 4/2002 | Young | 705/34 |
| 6,971,096 | B1 | * | 11/2005 | Ankireddipally et al. | 718/101 |
| 7,130,272 | B1 | * | 10/2006 | Gai et al. | 370/236 |
| 2003/0145156 | A1 | * | 7/2003 | Khandekar et al. | 711/104 |

FOREIGN PATENT DOCUMENTS

| JP | 06-282515 | 10/1994 |
| JP | 08-314872 | 11/1996 |
| JP | 2000-207474 | 7/2000 |
| JP | 2000-222305 | 8/2000 |

OTHER PUBLICATIONS

Niall Clarke, Distributed Software Licensing Framework based on Web Services and Soap, May 2002.*

* cited by examiner

*Primary Examiner* — Lechi Truong
(74) *Attorney, Agent, or Firm* — Fujitsu Patent Center

(57) ABSTRACT

An apparatus receives a first message based on a transmission trigger when receiving the transmission trigger indicating a transmission of the first message containing flow definition information for specifying an execution sequence of a plurality of applications performing a cooperative processing; calls an application to be executed according to the flow definition information contained in the first message; and transmits the second message containing the flow definition information and a result of execution by the called application to the transmission addressee executing the next application.

7 Claims, 20 Drawing Sheets

INPUT PARAMETER 1 = ELEMENT X, INPUT PARAMETER 2 = ELEMENT A, ..., OUTPUT PARAMETER = ELEMENT Z

F I G. 5

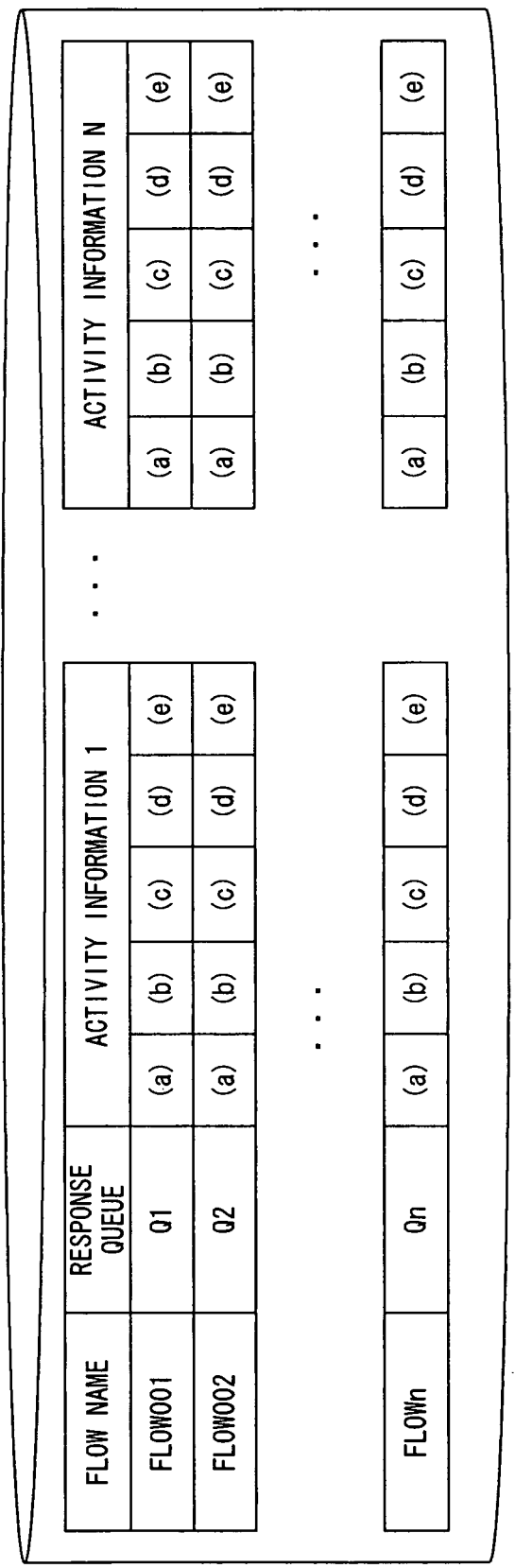
F I G. 6

| MsgSeqNo | message··· |
|---|---|
| 62328 | |
| 62329 | |

F I G. 7

| WaitSeqNo | SendMsgSeqNo | flag |
|---|---|---|
| 1 | 62328 | off |
| 2 | 62329 | on |
| 3 | 0 | |
| 4 | 0 | |
| 5 | 0 | |
| ... | ... | |

F I G. 8

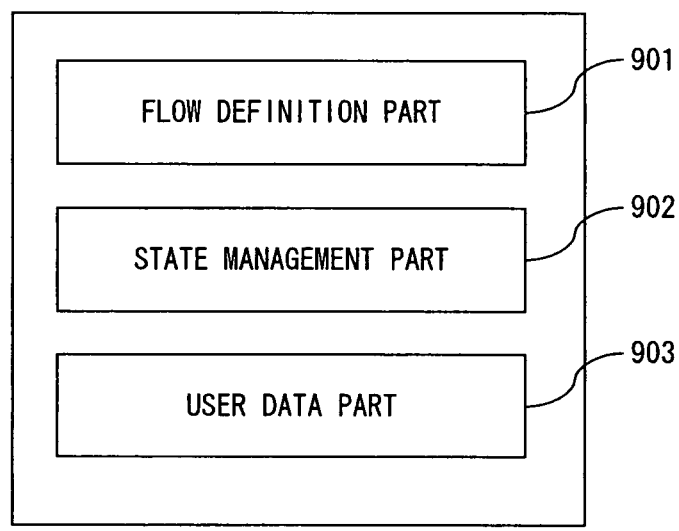
F I G. 9

FIG. 10

| FLOW NAME | ACTIVITY INFORMATION 1 | | | | | ... | ACTIVITY INFORMATION N | | | | |
|---|---|---|---|---|---|---|---|---|---|---|---|
| FLOW001 | (a) | (b) | (c) | (d) | (e) | | (a) | (b) | (c) | (d) | (e) |

| CURRENT POSITION | ACTIVITY NAME |
|---|---|
| PASSED-THROUGH ACTIVITIES | ACTIVITY I, ACTIVITY M, ACTIVITY N |

FIG. 11

| ELEMENT 1 | DATA 1 |
|---|---|
| ELEMENT 2 | DATA 2 |
| ELEMENT 3 | DATA 3 |

. . .

| ELEMENT N | DATA N |
|---|---|

F I G. 1 2

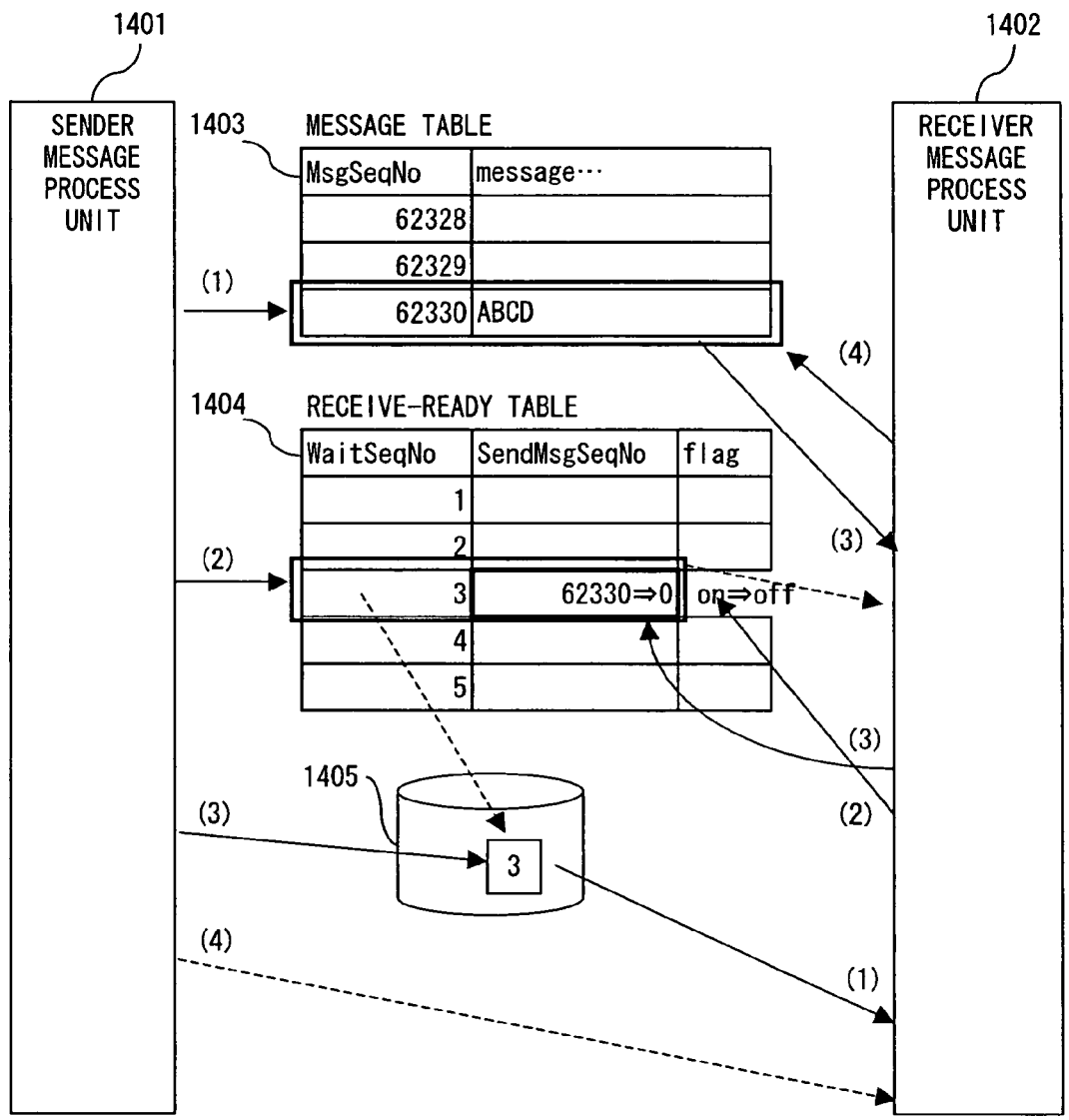
F I G. 1 4

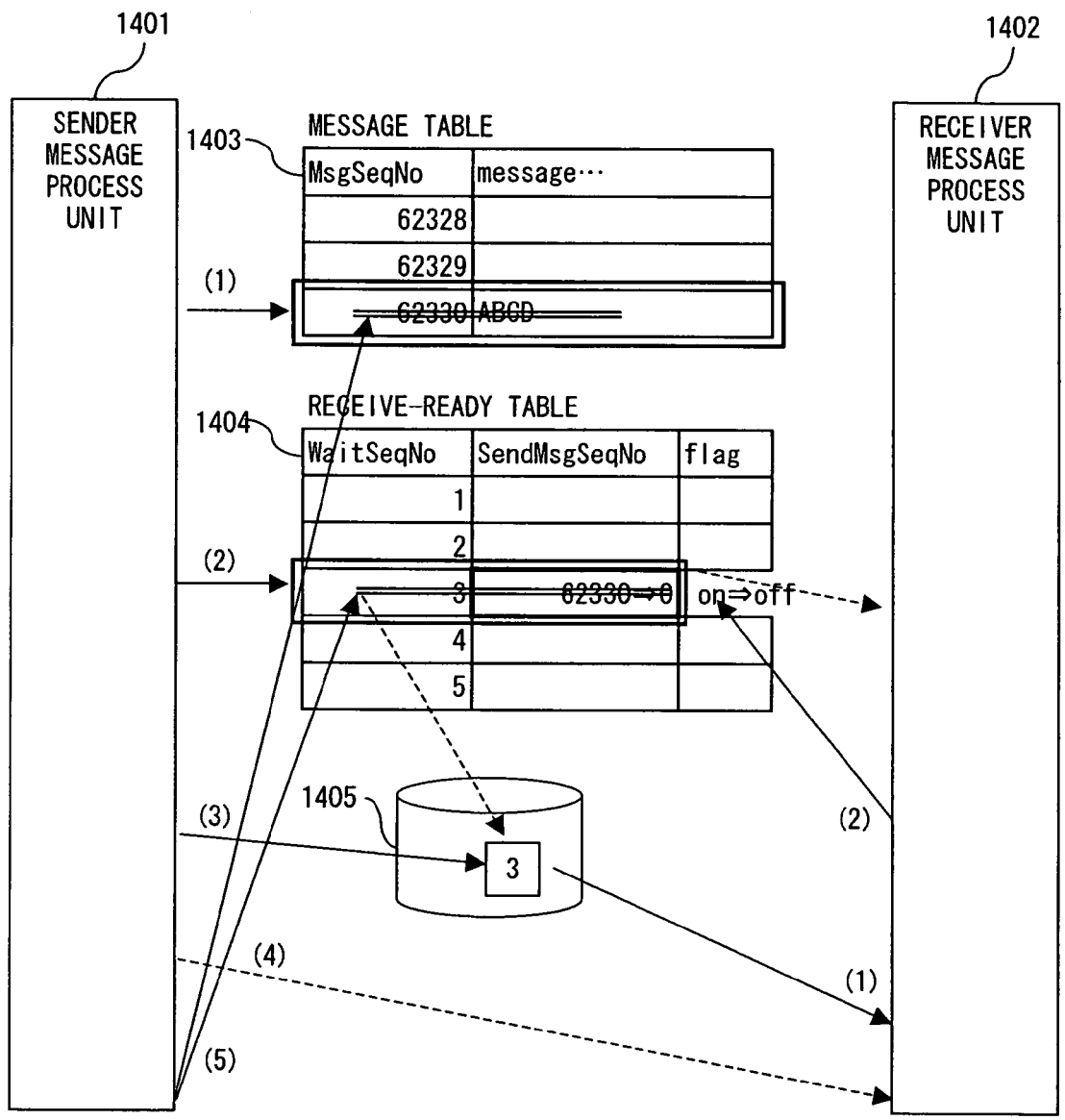
F I G. 1 5

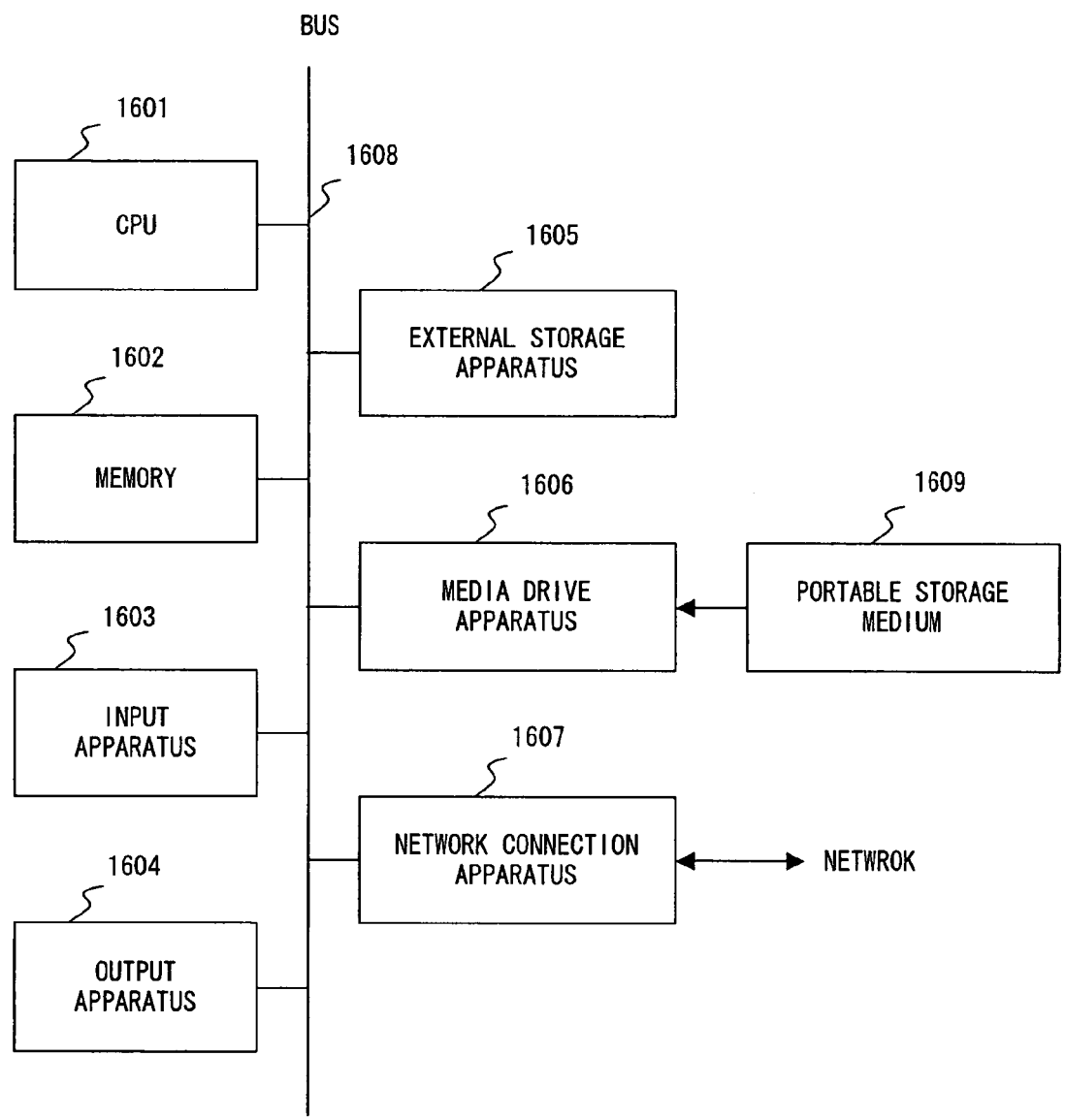
F I G. 1 6

APPLICATION FLOW CONTROL APPARATUS

BACKGROUND OF THE INVENTION

1. Field of the Invention

The present invention relates to an application flow control apparatus for controlling an execution sequence of a plurality of applications performing business transactions.

2. Description of the Related Art

An application is a software module used for a business transaction. In the field such as a key system for an enterprise providing services by a plurality of applications cooperating with one another in the environment of a high level integration of information systems, a system for making the applications cooperate with one another becomes important.

For instance, a consideration is given to a case for making applications 121 through 123 installed in servers 111 through 113, respectively, cooperating with one another in response to a requirement of a client such as a Web browser as shown by FIG. 1A. The client 101 and the servers 111 through 113 are connected by a communication network.

The applications 121 through 123 are provided for business transactions 1 through 3, among which the application 123 is for renewing a business data base 102. The requirements of the client 101 can be exemplified by the following two:

Requirement A: a business transaction 1 followed by a business transaction 3

Requirement B: a business transaction 1 followed by a business transaction 2 followed by a business transaction 3

For the requirement A, the application 121 is called, followed by the application 123; and for the requirement B, the applications 121, 122 and 123 are called in the aforementioned sequence. In these cases, a cooperative application to be called following the application 121 is not fixed and may be changed in the future.

If information about the followed application is coded therein, it becomes necessary to modify the sequence of calling (i.e., relationship) every time a change is made such as an addition or deletion of application.

Contrarily, if there is a system for sequentially calling an application in accordance with a prescribed cooperative flow for the applications, the above mentioned modification for the application itself becomes unnecessary, enabling the applications to be more portable and applicable to various business transactions. Such a flow technique is hence utilized for a method for integrating applications in the field of enterprise key systems.

Meanwhile, reliability is also required in terms of the characteristic of the key systems, such as assurance for messages (e.g. data) being transmitted among the applications and for uniqueness of data base processing (e.g., allowing no duplicate renewal).

FIG. 1B shows a centralized flow control system in which a flow control unit 132 is equipped in a specific management server 131. The flow control unit 132 calls the respective applications 121 through 123 in accordance with the execution sequence being described in a flow 133 to store the result in a state management data base 134. By this, a business transaction will be executed according to the flow 133.

Below listed patent document 1 relates to a centralized work flow assistance executive system, while a patent document 2 relates to a work flow management system for circulating a circulation material.

[Patent document 1] Japanese patent laid-open application publication No. 2000-207474

[Patent document 2] Japanese patent laid-open application publication No. 2000-222305

The above described conventional system for cooperative applications, however, has been faced with problems as follows.

In a centralized flow control system, the flow is executed by one management server under the management of a flow control unit, resulting in the processing capability being limited by capacities of the management server and communication network.

Also in the centralized flow control system, if an application called up by the flow control unit has been stopped, the flow stops at the time, requiring a command execution and a polling control at a certain time interval for restarting the flow.

As a countermeasure, an addition of flow control to the asynchronous communication can also be considered as shown by FIG. 1C. In the system shown by FIG. 1C, flow control units 141 through 143 and message queues 151 through 153 are equipped for the applications 121 through 123, respectively. Each flow control unit transmits a message to the queue for the next application as well as calls the application.

Merely building a flow control on a common asynchronous communication function, however, cannot assure a consistency of a message and business data being handled by an application, even if it can assure the message, since a message processing and a data base renewal for the application are executed by separate transactions. For maintaining a consistency between a message and business data, a transaction manager 161 for managing a global transaction is required, causing a problem of cost increase in view of recovery and performance.

SUMMARY OF THE INVETION

The first challenge of the present invention is to accomplish a cooperative processing of applications based on a flow without going through a specific management server.

The second challenge of the present invention is to maintain a consistency between a message and business data handled by an application in accomplishing a flow control by a message between applications.

In the first aspect of the present invention, an application flow control apparatus, being an apparatus equipped with a part of a plurality of applications for use in a cooperative processing, comprises a queue device and a message processing device.

The queue device receives a transmission trigger indicating a transmission of a first message containing flow definition information for specifying an execution sequence of a plurality of applications. The message process device receives the first message based on the transmission trigger, calls an application to be executed according to the flow definition information contained in the first message and transmits a second message containing the flow definition information and an execution result of the called application to a transmission addressee executing the next application.

In the second aspect of the present invention, the first message in the first aspect is stored in the same database as data being renewed by the called application, and the message process device renews the first message to the second message by using a transaction which is the same transaction for renewing the data by the called application and transmits a transmission trigger to the addressee for indicating a transmission of the second message.

BRIEF DESCRIPTION OF THE DRAWINGS

FIG. 5 shows a relationship between a parameter and an element;

FIG. 6 shows a flow definition data base;

FIG. 7 shows a message table;

FIG. 8 shows a table ready for receiving;

FIG. 9 describes a message;

FIG. 10 shows a flow definition part;

FIG. 11 shows a state management part;

FIG. 12 shows a user data part;

FIG. 14 shows a message processing in a normal condition;

FIG. 15 shows a message processing at an abnormality occurrence;

FIG. 16 shows a configuration of information processing apparatus;

DESCRIPTION OF THE PREFERRED EMBODIMENTS

The following description is about a preferred embodiment of the present invention in reference to the accompanying drawings.

Figure 1A:
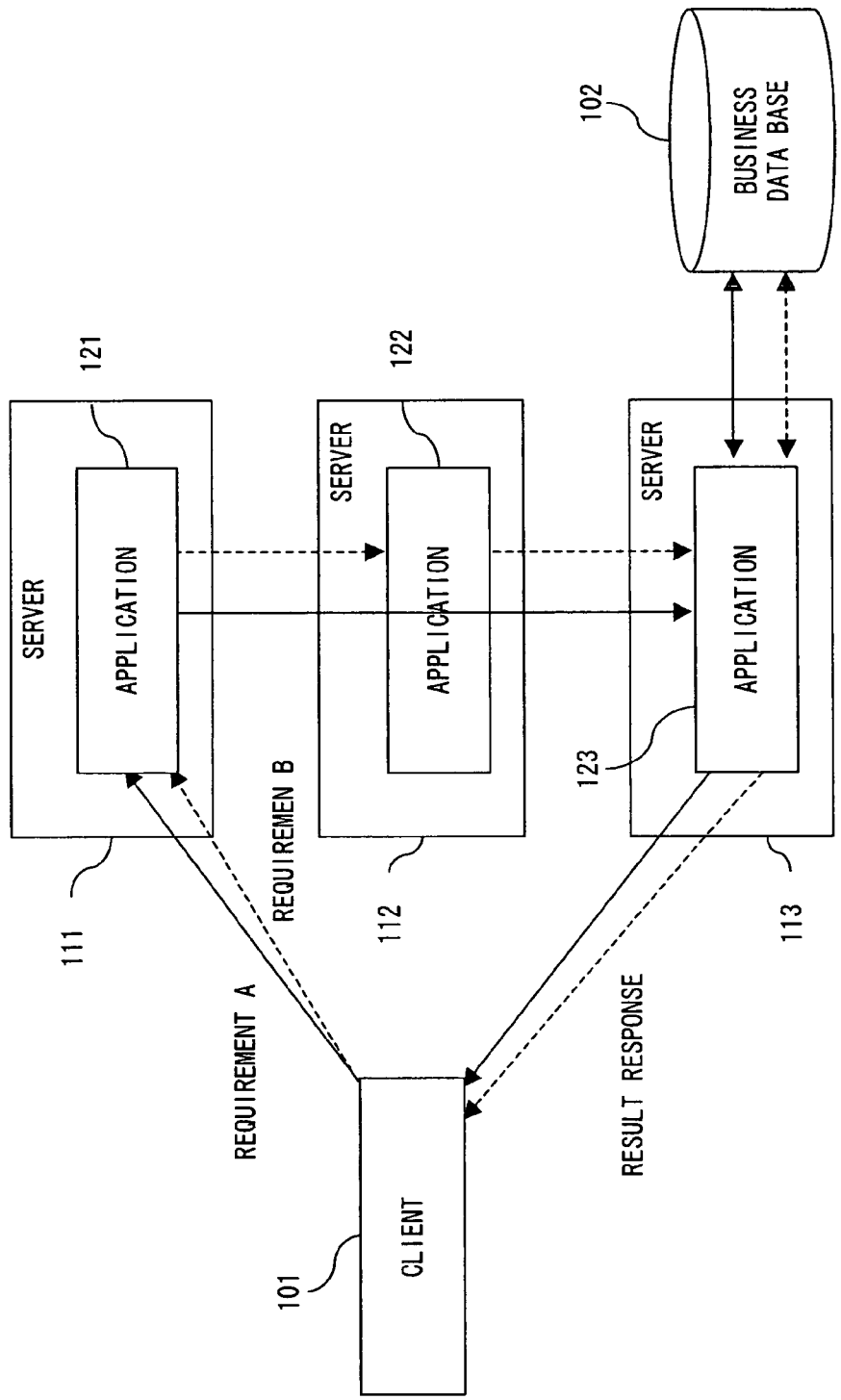
FIG. 1A shows cooperation among applications.
Figure 1B:
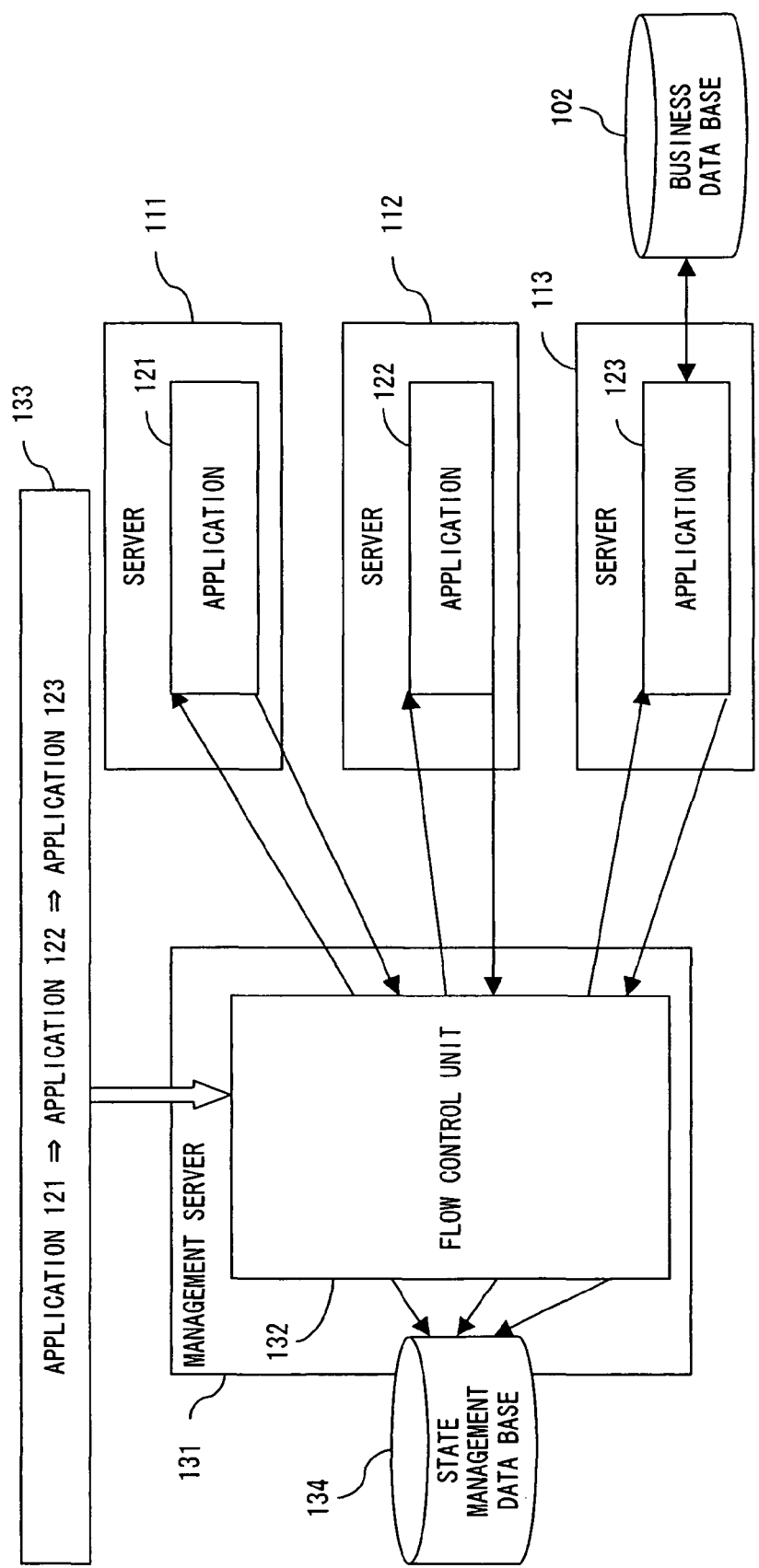
FIG. 1B shows a centralized flow control system.
Figure 1C:
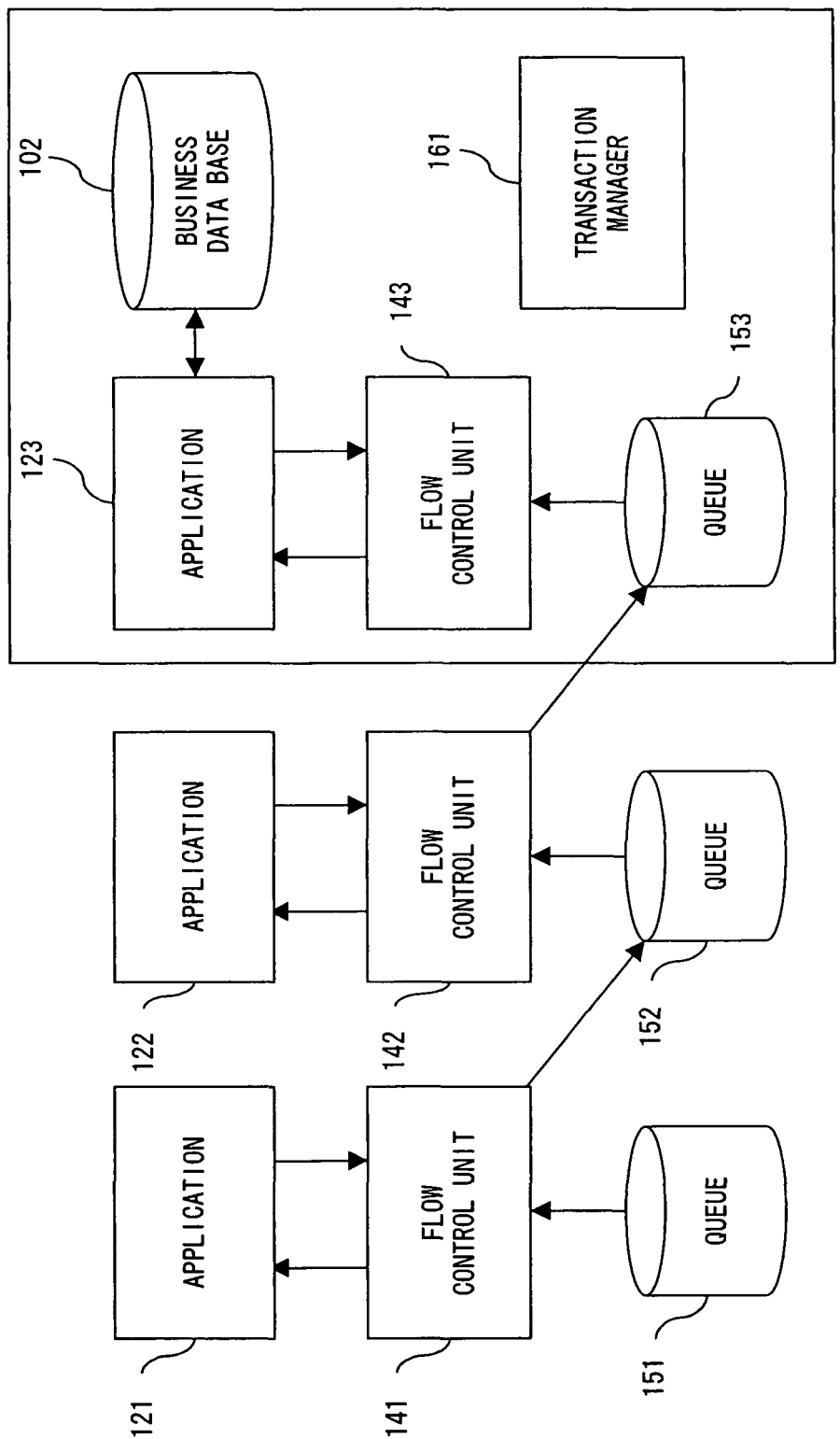
FIG. 1C shows a system with a flow control being added to an asynchronous communication.
Figure 2A:
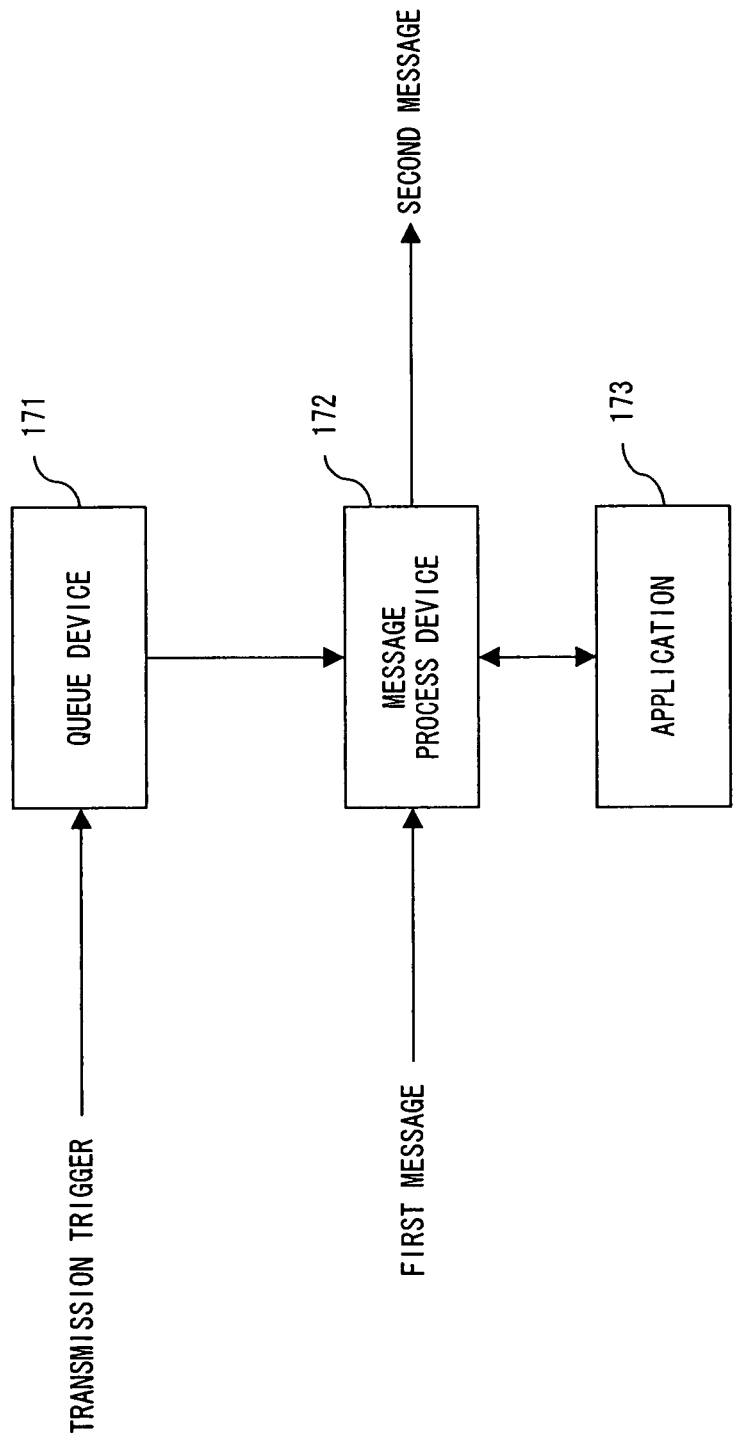
FIG. 2A shows the principle of an application flow control apparatus according to the present invention.

FIG. 2A shows the principle of an application flow control apparatus according to the present invention. The application flow control apparatus in the first aspect of the present invention, being an apparatus equipped with a part of plurality of applications for use in a cooperative processing, comprises a queue device 171 and a message processing device 172.

The queue device 171 receives a transmission trigger indicating a transmission of first message containing flow definition information for specifying an execution sequence of a plurality of applications. The message processing device 172 receives a first message based on the transmission trigger, calls an application 173 for an execution according to the flow definition information contained in the first message and transmits a second message containing the flow definition information and an execution result of the called application 173 to a transmission addressee executing the next application.

When the first message is transmitted from the sender to the application flow control apparatus, a transmission trigger indicating the aforementioned transmission is sent to the queue device 171. The message process device 172 specifies an application 173 to be executed according to the flow destination information contained in the message, followed by specifying an application 173 to be executed according to the flow definition information contained by the message. The called up application 173 executes a business transaction and returns the execution result to the message process device 172 which creates a second message to send to the addressee.

In a case where a plurality of applications are distributively installed in the plurality of application flow control apparatuses, an application flow control apparatus equipped with one application transmits a message for the flow control directly to the application flow control apparatus equipped with the next application.

In the second aspect of the present invention, the first message in the first aspect is stored in the same data base as data being renewed by the application 173, and the message process device 172 renews the first message to the second message by using a transaction which is the same transaction for renewing the data by the called application 173 and transmits a transmission trigger to the transmission addressee for indicating a transmission of the second message.

According to the present invention, since a message for a flow control is transmitted between apparatuses installing the respective applications, a cooperative processing by the applications based on the flow is accomplished without going through a specific management server. In the meantime, if an application has been stopped, there is no need for a management server executing a restart command or a polling control.

And, it is possible to maintain a consistency between a message and data handled by the application by renewing the message and the application data by one transaction.

Figure 2B:
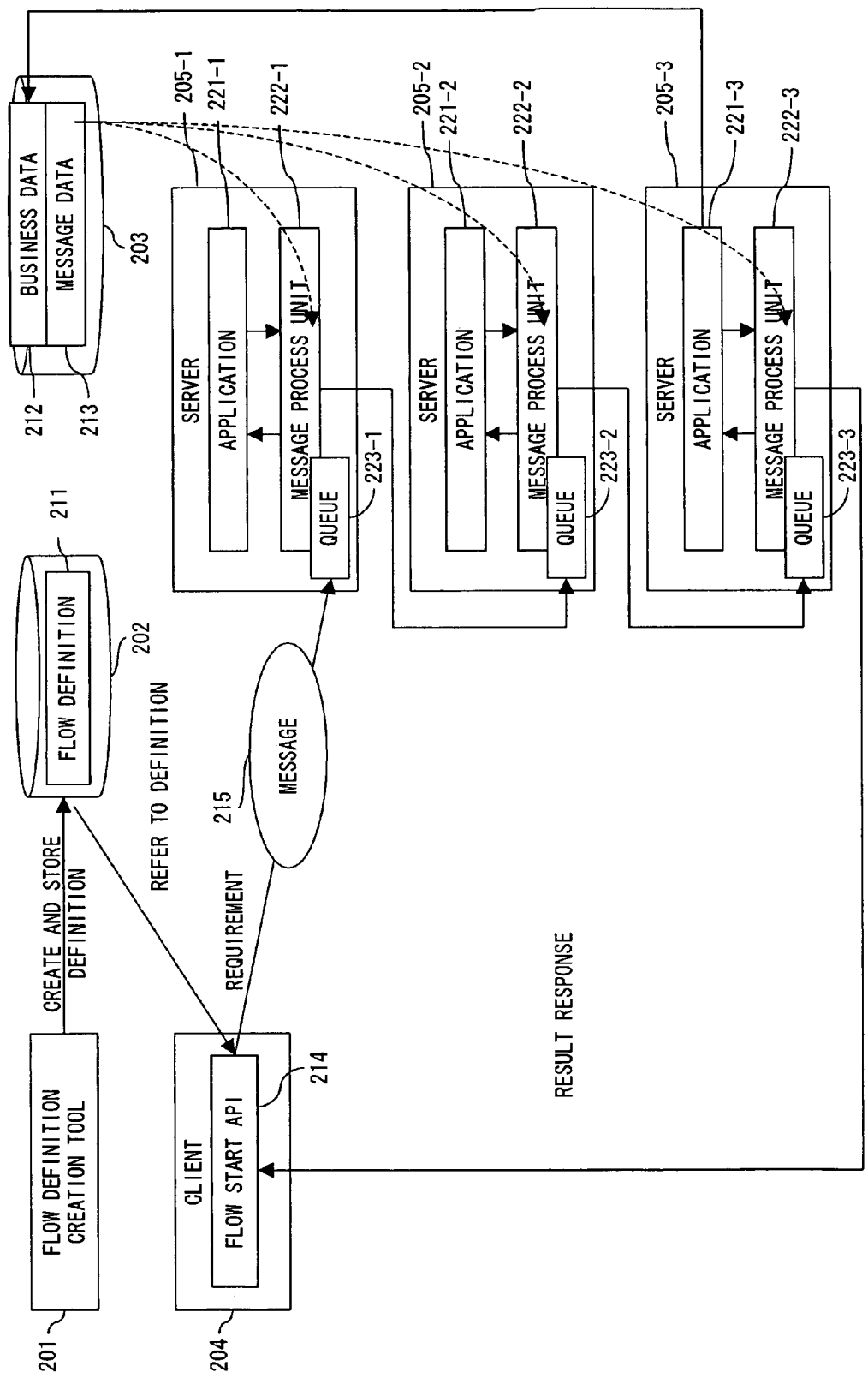
FIG. 2B shows a configuration of application flow control system.

FIG. 2B shows an example configuration of application flow control system according to the present embodiment.

The system shown by FIG. 2B comprises a flow definition creation tool 201, a flow definition data base 202, a business data base 203, a client 204 and servers 205-1 through 205-3. The client 204 comprises a flow start API (Application Program Interface) 214, while the server 205-$i$ (where i=1,2,3) comprises applications 221-$i$, message process units 222-$i$ and queues 223-$i$, all for executing the i-th business transactions, respectively.

The system shown by FIG. 2B has the following characteristics:

1. The each server 205-$i$ comprises a message process unit 222-$i$, and a message contains information of a flow definition 211 dealing with an execution sequence of the applications;
2. The message process unit 222-$i$ calls the application 221-$i$ by receiving the message and transmits the execution result to the next message process unit, thereby executing the flow;
3. A message received by the message process unit 222-$i$ is processed by going through the queue 223-$i$ being equipped in a memory, accumulated in the queue 223-$i$ when the application 221-$i$ is being stopped and then becomes receivable at the time when the application 221-$i$ is restarted;
4. The message contains information about a flow state (i.e., the current position) so that the message process unit 222-$i$ specifies the application to be called according to the flow definition 211 and the flow state;
5. The message contains execution information of the flow so that the current progress of processing and the routing of processing can be distinguished by referring to the message;
6. The message data 213 is stored in the business data base 203 as same as the business data 212 so that the consistency between the message data 213 and the business data 212 is maintained by using the transaction of business data base, hence eliminating a need of a transaction manager; and
7. The uniqueness of business transaction is assured by assuring the consistency of the communication among the message process units 222-$i$ accomplishing the flow and the processing of the above described paragraph 6.

First of all, the user creates a flow definition 211 according to the flow definition creation tool 201 as a preparatory work for a flow execution and stores the flow definition 211 in the flow definition data base 202. The flow definition 211 shows executions of the three applications 221-1, 221-2 and 221-3 in the aforementioned sequence.

Then, for executing the flow, the client 204 executes the flow start API 214 which refers to a flow definition 211 in the flow definition data base 202, sets the information in a message, and transmits the message 215 to the message process unit 222-1 for the application 221-1 to be called first.

The message process unit 222-1 calls the applicable application 221-1 based on the flow definition 211 and the flow state contained in the message 215. The application 221-1 executes the first business transaction, and, upon finishing it, the server 205-1 goes back to the processing of the message process unit 222-1. Then, the message process unit 222-1 transmits a message to the message process unit 222-2 for the application 221-2 to be called next.

The message process unit 222-2, the same as the message process unit 222-1, calls the application 221-2 which executes the second business transaction. Then, the message process unit 222-2 transmits a message to the message process unit 222-3 for the application 221-3 to be called next.

The message process unit 222-3, the same as the message process unit 222-1, calls the application 221-3 which executes the third business transaction and renews the business data 212 in the business data base 203. Then the message process unit 222-3 notifies the processing result of the flow to the client 204.

The message process units 222-1 and 222-2 specify the application to be called next according to the flow definition 211 and/or the processing result of the executed application.

Note that each server is equipped with one application so that the three applications installed in the three servers are executed in cooperative processing in this example, however, it is possible to have each server installing a plurality of applications and many applications installed in many servers perform such cooperative processing.

Figure 3:
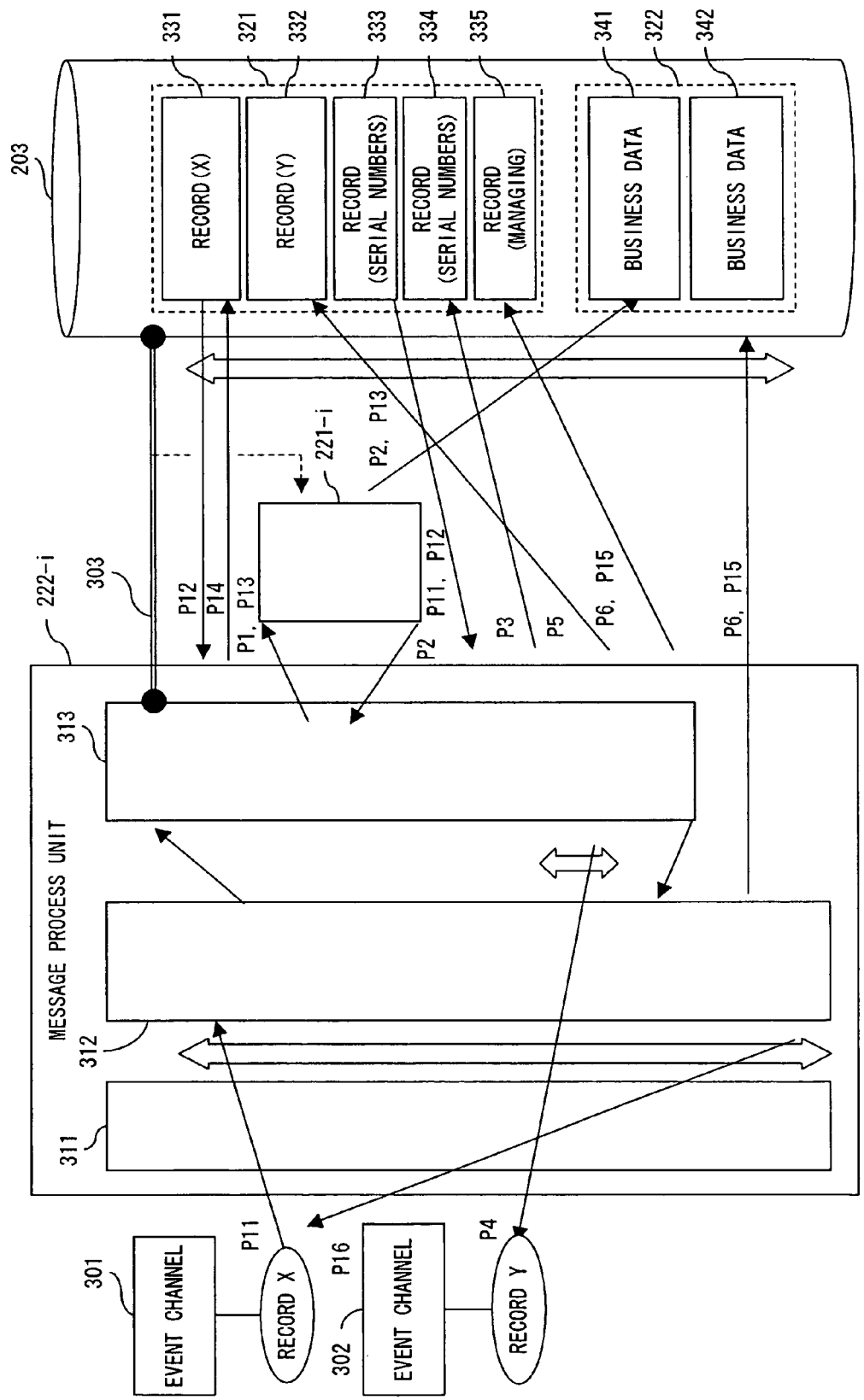
FIG. 3 shows a configuration of message process unit.

FIG. 3 shows an example configuration of message process units 222-*i* using J2EE™ (Java® 2 Enterprise Edition). The message process units 222-*i* shown by FIG. 3 include JMS (Java® Message Service) 311 and EJB® (Enterprise Java® Beans) container 312 and framework 313.

In the business data base 203, a message area 321 and a business usage table 322 are included; records 331 through 335 are stored in the message area 321; and business data 341 and 342 are stored in the business usage table 322.

In this case, the message process units 222-*i* and the applications 221-*i* perform the processing as follows:

<Transmission Processing>

(P1) The framework 313 calls the application 221-*i*;

(P2) The application 221-*i* renews the business data 341 of the business usage table 322 by using a connection 303 of the business usage table 322, followed by returning to the processing of the framework 313;

(P3) The framework 313 locks the record 334 of the message area 321 by a renewal processing by using the connection 303 the same as P2. The record 334 is a receive-ready record for the message recipients being ready for receiving. The record 334 is set by a record number for the record 332 for retaining information of a message text;

(P4) The framework 313 transmits a transmission trigger (i.e., JMS message) indicating a transmission of message to an event channel 302 which is a queue for the transmission destination, and performs a JMS commit processing. The transmission trigger is set by the record number for the record 334 in a receive-ready condition which has been locked as such in P3;

(P5) The framework 313 stores the information of a message text for transmission in the record 332 of the message area 321;

(P6) The container 312 commits a data base processing by which a data base processing by using the connection 303 is committed, unlocking the receive-ready record 334. A message transmission and a business data renewal are thus processed in one transaction. If the message recipient has been waiting for record to be unlocked, the waiting state is unlocked by a commit, thereby continuing a receiving process. Meanwhile, the framework 313 renews the record 335 for managing the records 331 through 334 of the message area 321.

<Receiving Processing>

(P11) The container 312 takes the received message out of the event channel 301 which is a queue within the same server, obtains the record number contained in the message for a receive-ready record 333 which has been locked by the sender and hands the record number over to the framework 313. The framework 313 performs a renewal processing for the receive-ready record 333 by using the connection 303. If a data base operation by the sender is not committed or rolled back, a "wait for unlock" state will continue until either of the aforementioned operation is started;

(P12) The framework 313 obtains a record number for the record 331 in the message text which is set in the record 333, following the receive-ready record 333 being unlocked and a successful renewal processing, and obtains the message text from the record 331;

(P13) The framework 313 calls the application 221-*i* which renews business data 341 in the business usage table 322 by using the connection 303 the same as in the P11 above;

(P14) The framework 313 deletes the record 331 of the obtained message text;

(P15) The container 312 commits a data base processing by which a data base processing operation by using the connection 303 is committed, thereby processing a receiving message and a business data renewal in one transaction; and (P16) The container 312 commits a processing for receiving message from the event channel 301.

<Processing for Assuring a Consistency of Data at an Abnormality Occurrence>

Notification of a renewal of the business database 203 to the process as notification addressee by way of a communication can be generally considered. In such a case, however, there is a possibility of renewal communication unable to reach at the addressee or resulting in a processing based on erroneous information at the receiving end, if an abnormality occurs at the transmitting end, such as roll back of transaction, processing failure, server failure, et cetera.

For instance, there is a possibility of the corresponding data base record being nonexistent even though the queue stores a transmission trigger in the following cases:

(1) where an abnormality occurs such as a roll back of transmission message, a process failure, et cetera, after the transmitting end commits a data base processing.

(2) where a committing data base processing is failed after the receiving end committing the transmitted message.

In these cases, the message process unit 222-*i* responds to the problem by ignoring the transmission trigger in the queue. Specifically, finishes the receiving processing by committing the received message followed by starting another receiving processing for the next receiving message. Such a response makes it possible to accomplish a flow processing with a consistency of data being secured even though the above described abnormalities occur.

The above described application flow control system gains effects as follows:

1. A transmission of message for the flow control from an application to the next application directly enables a high speed message processing among many servers being distributively operated, without going through a specific management server.
2. There is no need for the flow controlling process to await the processing completions of all the called applications as is the case in a centralized flow control system, hence shortening an occupancy time of the process (i.e., thread).
3. A collection of execution information about the applications enables a tracking of the progress of each processing in spite of being a distributed operation.
4. When a problem such as server failure occurs, an ability of resuming the processing at the point of the interruption enables a highly reliable flow control.
5. A capability of continuing the flow at the time of starting the application allows it to avoid an extraneous consumption of CPU (Central Processing Unit) power for polling.
6. Requiring no transaction manager enables a consistency of data to be maintained at a low cost What follows here is a detailed description of configuration and operation of the above described application flow control system in reference to FIGS. 4 through 15.

Figure 4:
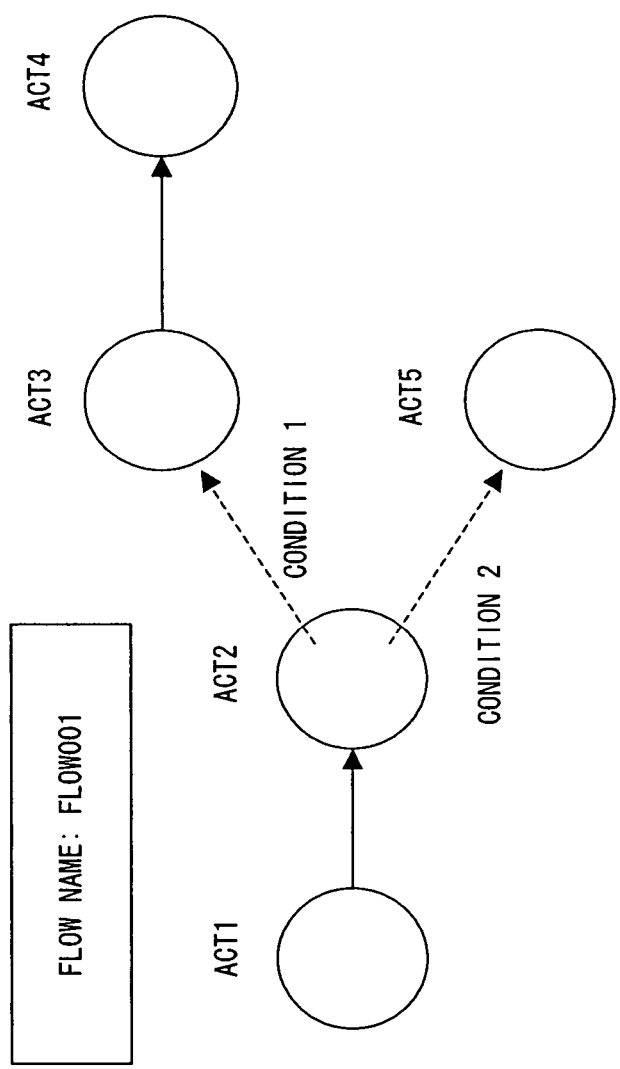
FIG. 4 shows an execution flow of applications.

The flow definition 211, shown by FIG. 2B, which is the information for specifying an execution flow of an application, is created by the flow definition creation tool 201. The execution flow of an application is accomplished by connecting the activities (i.e., ACT 1 through ACT 5) corresponding to the applications with arrows as shown by FIG. 4. And a branching part (i.e., dotted line with an arrow in FIG. 4) can be described by the following conditional equations for example:

Condition 1: branch to ACT 3 if the element n>10
Condition 2: branch to ACT 5 if the element n≦10

The flow definition 211 is also identified by a flow name as unique identifier and capable of creating a plurality of flow definitions 211. Note that the number or branch of the activities can be defined discretionarily. Each activity (i.e., ACT n) is defined by the information as follows:

(a) An activity name;
(b) Relationship among the executing application name, the input and output parameters for the application and the element of the user data part of a later described message. A relationship between the parameter and the element of the user data part is specified by the format as shown by FIG. 5;
(c) The queue name corresponding to the application;
(d) An activity name to be executed next. This activity name corresponds to the solid arrow in FIG. 4 in terms of flow definition; and
(e) Conditional equation [(message element n) comparison equation (value)] for allocating the activity to be executed next and the activity name corresponding to each condition.

Thus created flow definition 211 is stored in the flow definition data base 202 which stores the information by the unit of flow (i.e., flow name and response queue name) and a record containing the information of the above described (a) through (e) being defined for each activity, for each flow as shown by FIG. 6.

A message table, a receive-ready table and a management table are set up for each queue of each server in the message area 321 shown by FIG. 3. These tables are created by using a Create Sequence. N.B. the Create Sequence is a serial number assignment function for issuing the serial number provided by a data base.

Figure 7:
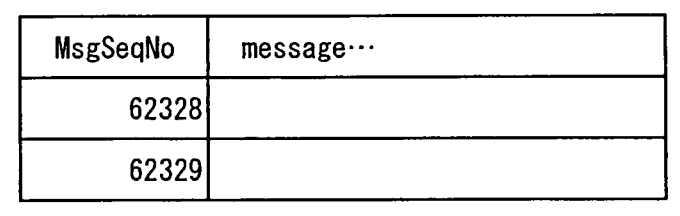

FIG. 7 shows the data structure of a message table containing the following information:

(1) MsgSeqNo: an identifier for identifying a message uniquely by using the value created by the Create Sequence for the message table; and (2) message . . . : it is the message text.

The number of initial record in the message table is zero (0).

FIG. 8 shows the data structure of a receive-ready table in which a record contains the information as follows:

(1) WaitSeqNo: it is a record number (1, 2, 3, . . . .) The initial value is set by a number within the range created by the Create Sequence for a receive-ready table;
(2) SendMsgSeqNo: the MsgSeqNo for the record of the transmitting message is stored. The initial value is zero (0); and
(3) flag: a flag for indicating whether the message has been received or not. The initial value is "off" (i.e., receive complete).

As the initial record for a receive-ready table, the number of records required for being ready to receive is secured at the time of creating the table to be used cyclically.

Meanwhile, the management table (not shown in a figure) is set by the information as follows:

(1) The Create Sequence for a message table (MSGSEQ): this is used for creating the MsgSeqNo for a message table. The Create Sequence assures the sequence of messages; and
(2) The Create Sequence for receive-ready table (WAITSEQ): this is used for creating a value for WaitSeqNo of a receive-ready table. The WAITSEQ value is used as a pointer for a receive-ready table, with the values being cyclically counted up to the maximum number of records which are contained in the receive-ready table.

The data required for making applications cooperate with one another is propagated by using a message. A message text (i.e., message . . . ) is made up of the three parts as shown by FIG. 9, as follows. Note that one message corresponds to one flow definition.

(1) Flow Definition Part 901

This is an area for storing the information about a specific flow definition stored in the flow definition data base 202. The flow name and the definition values (a) through (e) for the activity information 1 through n, respectively, are set as shown by FIG. 10;

(2) State Management Part 902

This is an area containing the current position of flow and the parameter for storing the passed-through activity names as shown by FIG. 11. The activity name indicating the current position of the flow is set for the current position, while all the passed-through activity names are sequentially stored for the passed-through activity; and (3) User Data Part 903

This area is comprised by a discretionary number of elements for which the user data corresponding to the respective elements are stored as shown by FIG. 12.

Figure 13:
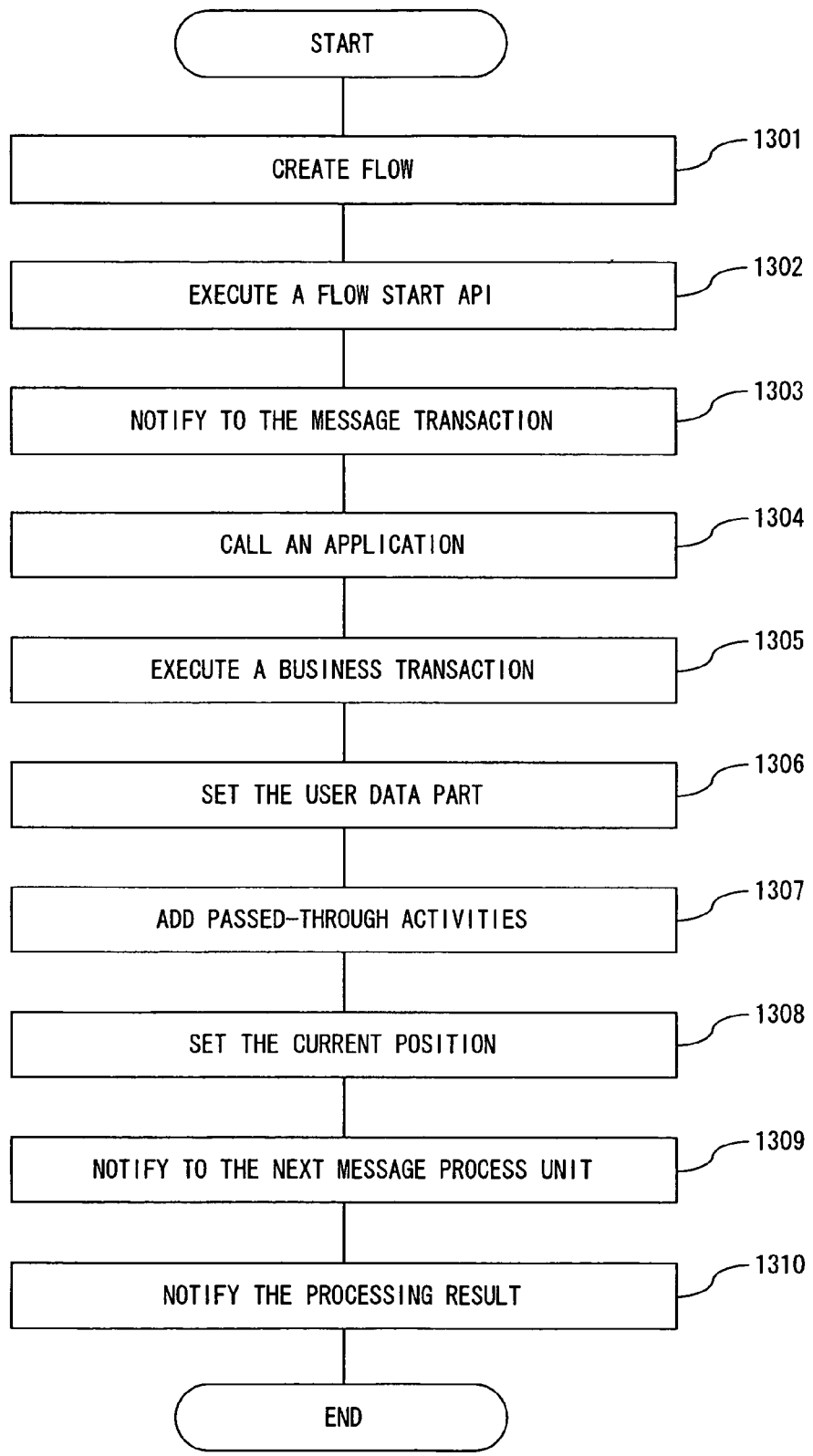
FIG. 13 is a flow chart of processing performed by an application flow control system.

FIG. 13 is a flow chart of processing performed by an application flow control system. First of all, the flow definition creation tool 201 creates a flow definition 211 to store in the flow definition data base 202 (step 1301). Then the client 204 executes the flow start API 214 (step 1302) which performs the following processing of (step 1303):

reading a flow definition 211 by referring to the flow definition data base 202 by using the flow name to be executed as the key and setting the flow definition 211 in the flow definition part 901 of the message 215;
setting the name of the activity 1, being the head activity of the flow, for the current position of the state management part 902 of the message 215;
setting data for the element of the user data part 903 of the message 215;

transmitting the message 215 to the queue 223-1 corresponding to the activity which is set at the current position; and waiting for the flow processing result at the response queue defined by the flow definition part 901.

The message process unit 222-1 at the transmission destination receives the message 215 from the queue 223-1, specifies and calls the application 221-1 to be executed in the following procedure of (step 1304):

specifying an activity (n) to be executed by referring to the activity name at the current position of the state management part 902 of the message 215;

referring to the information of the above described paragraphs (a) through (e) set in the flow definition part 901 of the message 215; and specifying the application name to be called, setting the element for the user data part 903 of the message 215, both based on the information of the paragraph (b), and executing the application 221-1.

The application 221-1 executes the first business transaction and, upon finishing it, outputs an output parameter to the message process unit 222-1 (step 1305).

Upon receiving it, the message process unit 222-1 identifies the element of the user data part 903 corresponding to the output parameter of the application 221-1 and sets the output parameter for the aforementioned element of the message 215 (step 1306).

Then, the message process unit 222-1 adds the activity name set at the current position of the state management part 902 of the message 215 to the passed through activity of the state management part 902 (step 1307).

Then, the message process unit 222-1 determines the activity to be executed next in the following two cases and sets either one of the determined activity names for the current position of the state management part 902 of the message 215 (step 1308):

If the branching condition as described in the above paragraph (e) for the activity corresponding to the executed application 221-1 is not defined for the flow definition part 901 of the message 215, it determines the above paragraph (d) of the flow definition part 901 as the activity to execute next.

If the branching condition as described in the above paragraph (e) for the activity corresponding to the executed application 221-1 is defined for the flow definition part 901 of the message 215, it substitutes the output parameter of the application 221-1 for the conditional equation of the above described paragraph (e) and determines an activity specified in accordance with the result as the activity to be executed next.

Then, the message process unit 222-1 searches, in the flow definition part 901 as the activity name as the key, for activity information corresponding to the activity which is set for the current position of the state management part 902 and determines the queue name stored in the above described paragraph (c) of the applicable activity (step 1309). Then, it transmits the renewed message 215 to the identified queue 223-2.

Having received the aforementioned message, the message process unit 222-2 executes the similar processing according to the information of the flow definition part 901 and transmits a message to the queue 223-3 of the message process unit 222-3 which also executes the similar processing and, upon finishing the flow, notifies the processing result by transmitting a message to the response queue specified by the flow definition part 901 (step 1310).

FIG. 14 shows a message processing in a normal condition performed by a sender message process unit 1401 and a receiver message process unit 1402. The following lists the processing by the sender message process unit 1401 in the sequence of:

(1) obtaining the MsgSeqNo (e.g., 62330) for a transmission message record from the Create Sequence for the message table of the management table to insert the message text (e.g., ABCD) in a record of the message table 1403;

(2) obtaining the WaitSeqNo (e.g., 3) for a receive-ready table record from the Create Sequence for the receive-ready table of the management table, setting the MsgSeqNo for a transmission message in the SendMsgSeqNo of the object record, setting "on" for the flag to renew the record. Or, re-obtaining the WaitSeqNo for a receive-ready table record from the Create Sequence for the receive-ready table, if the flag is already "on", meaning that the applicable record is still in use;

(3) transmitting the WaitSeqNo for the record of the renewed receive-ready table 1404 as a transmission trigger to the receiver queue 1405. In this case the message text is not transmitted to the queue 1405;

(4) issuing a JMS commit for the transmission message; and (5) issuing a data base commit.

By the JMS commit, the receiver message process unit 1402 starts processing upon receiving the transmission trigger. The following lists the processing by the receiver message process unit 1402 in the sequence of:

(1) taking the message (WaitSeqNo) out of the queue 1405;

(2) performing a renewal processing for the receive-ready table 1404, and setting the flag to "off" for the WaitSeqNo record stored in the taken out message. This completes the setting for indicating a receiving complete state. If a data base commit is not complete at the sender, a wait state continues until the completion;

(3) obtaining the SendMsgSeqNo for the receive-ready table record freed from a wait state, and obtaining the record of the MsgSeqNo in agreement with the obtained number from the message table 1403, followed by renewing the SendMsgSeqNo to zero (0) for the receive-ready table record;

(4) deleting the obtained record of the message table 1403;

(5) issuing a data base commit; and (6) issuing a JMS commit for the received message.

If the above described message processing is controlled by the message table 1403 only, the processing in the sequence (3) at the sender starts before a completion of data base commit in the sequence (5) at the sender, possibly resulting in accessing to the message table 1403. In this case, a message fails to be received if a record is not inserted in the message table 1403. That is why the present embodiment applies an exclusive control by using the receive-ready table 1404, in addition to the message table 1403, thereby preventing a receiving failure.

FIG. 15 shows a message processing at an abnormality occurrence after the sender completing a JMS commit. In this case the above described processing sequences (1) through (4) by the sender message process unit 1401 are the same as the case of FIG. 14.

Subsequently, a data base commit of the above sequence (5) fails due to a cause such as a server abnormality. At this point in time, a transmission trigger is already normally notified to the receiver, whereas the data base is now rolled back, resulting in a conflicting state. With the data base having been rolled back, the data base operation done in the above described sequences (1) and (2) are now cancelled, a record of the message table 1403 is nonexistent, and the receive-ready table 1404 is now in the state of a cancelled renewal (i.e., SendMsgSeqNo=0).

With a JMS commit by the sender, the receiver message process unit 1402 starts processing by receiving the transmission trigger. In this case, the processing sequences (1) and (2) by the receiver message process unit 1402 are the same as the case of FIG. 14.

Subsequently, the receiver message process unit 1402 obtains the SendMsgSeqNo for a receive-ready table record, but the obtained SendMsgSeqNo becomes zero (0) since the operation of the above described sequence (2) is cancelled at the sender. Judging accordingly that an abnormality has occurred at the sender after transmitting the transmission trigger, the receiver message process unit 1402 issues a JMS commit and negates the received transmission trigger, followed by rolling back the renewal processing of the above described sequence (2) by the receiver.

Contrarily, if an abnormality occurs at the receiver after completing a data base commit and before a JMS commit, the processing above described sequences (1) through (5) by the sender message process unit 1401 and the above described processing sequences (1) through (5) by the receiver message process unit 1402 are the same as the case of FIG. 14.

Subsequently, the JMS commit of the above described sequence (6) at the sender is failed by a cause such as a server abnormality and the transmission trigger is rolled back. This brings forth a conflicting state of the existence of a transmission trigger in spite of a renewal processing for the data base being completed. In this event, the receiver message process unit 1402 negates the transmission trigger in the following sequence of:

(7) taking the same message as the above described sequence (1) out of the queue 1405 to receive a transmission trigger;

(8) performing a renewal processing for the receive-ready table record of the WaitSeqNo being stored in the taken out message as in the above described sequence (2); and (9) issuing a JMS commit to negate the received transmission trigger by judging the transmission trigger having been processed, following obtaining the SendMsgSeqNo for a receive-ready table record to end up finding that the obtained SendMsgSeqNo is equal to zero (0) since the SendMsgSeqNo is already renewed to zero (0).

Incidentally, the client 204 and the servers 205-1 through 205-3 shown by FIG. 2B comprise themselves by using an information processing apparatus (e.g. computer) shown by FIG. 16 for instance. The information processing apparatus shown by FIG. 16 comprises a CPU 1601, a memory 1602, an input apparatus 1603, an output apparatus 1604, an external storage apparatus 1605, a media drive apparatus 1606 and a network connection apparatus 1607, with a bus 1608 interconnecting the above mentioned components.

The memory 1602, comprehending ROM (Read Only Memory), RAM (Random Access Memory), et cetera, stores the program and data used for the processing. The CPU 1602 performs the necessary processing by executing the program by using the memory 1602.

The flow definition creation tool 201, flow start API 214, applications 221-i and message process units 222-i shown by FIG. 2B; and the JMS 311, container 312 and framework 313 shown by FIG. 3 all correspond to the program stored in the memory 1602. Meanwhile, the queues 223-i shown by FIG. 2B correspond to the data stored in the memory 1602.

The input apparatus 1603 is used for inputting the operator instruction or information for instance. The output apparatus 1604, comprehending a display, a printer, a speaker, et cetera, is used for outputting an inquiry to the operator, a processing result, et cetera.

The external storage apparatus 1605 comprehends a magnetic disk, an optical disk, a magneto-optical disk, a magnetic tape apparatus, et cetera. The information processing apparatus stores the program and data in the external storage apparatus 1605 and use them by loading in the memory 1602 as required. The external storage apparatus 1605 can also be used for the flow definition data base 202 and the business data base 203.

The media drive apparatus 1606 drives a portable storage medium 1609 to access to the storage content. The portable storage medium 1609 comprehends a discretionary computer readable storage medium such as a memory card, a flexible disk, an optical disk, a magneto optical disk, et cetera. The operator stores the program and data in the portable storage medium 1609 and uses them by loading in the memory 1602 as required.

The network connection apparatus 1607, being connected to a discretionary communication network such as LAN (Local Area Network), performs a data exchange associated with communication. The information processing apparatus may receive the program and data from an external apparatus by way of the network connection apparatus 1607 to store in the memory 1602 for use.

Figure 17:
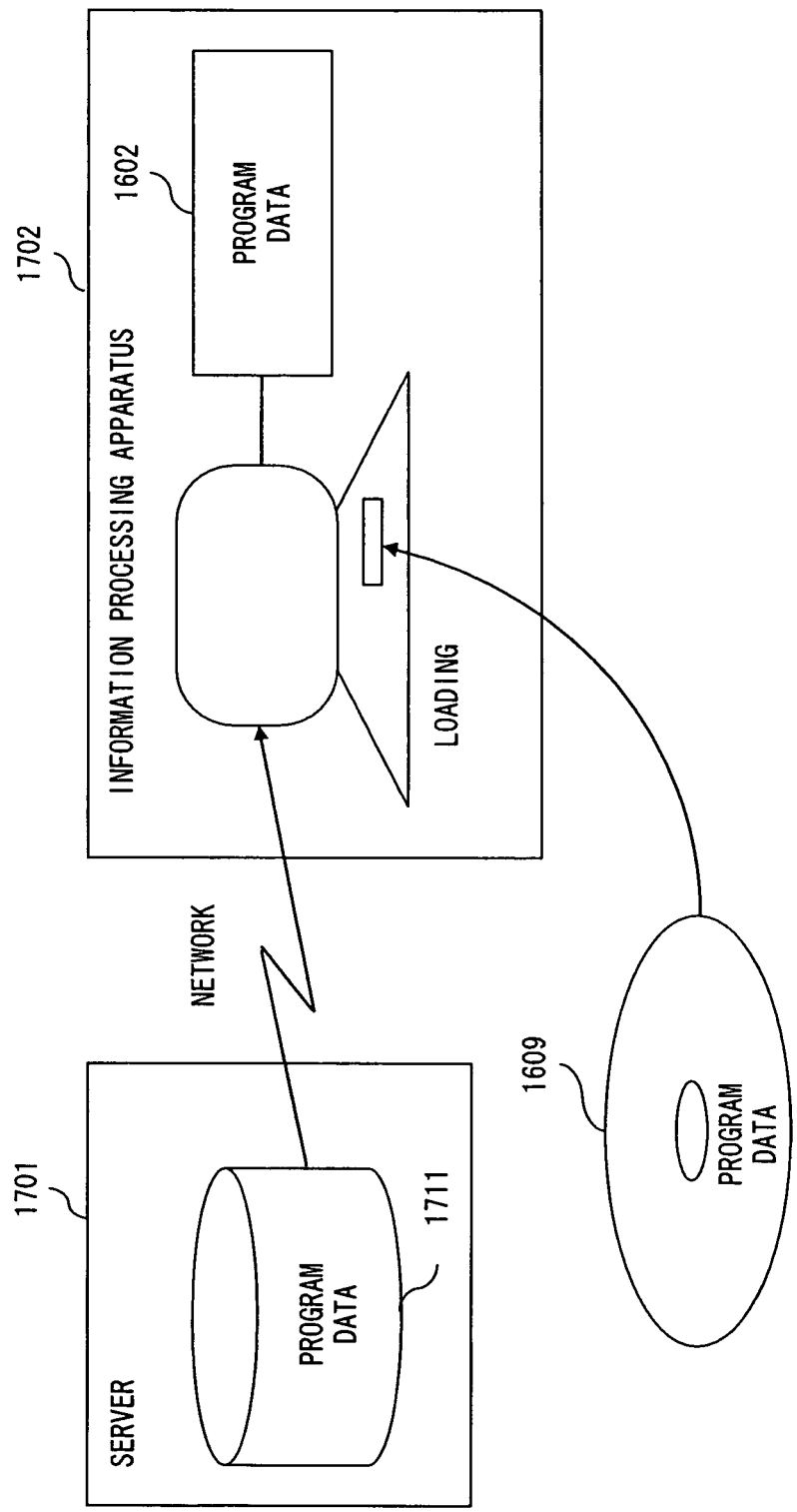
FIG. 17 shows a method for providing a program and data.

FIG. 17 shows a method for providing a program and data to the information processing apparatus shown by FIG. 16. The program and data stored in a data base 1711 of the portable storage medium 1609 or server 1701 are loaded onto the memory 1602 comprised by the information processing apparatus 1702. The server 1701 generates a carrier signal for carrying the program and data to transmit to the information processing apparatus 1702 by way of a discretionary transmission medium on the network. The CPU 1601 executes the program by using the data in order to perform the required processing.

What is claimed is:

1. An application flow control apparatus having a part of a plurality of applications performing cooperative processing, the apparatus comprising:

a physical storage to receive a transmission trigger indicating that a first message, containing flow definition information for specifying an execution sequence of the plurality of applications, has been transmitted, the transmission trigger including identification information for identifying the first message; and a processing unit to recognize that the first message has been transmitted when the physical storage receives the transmission trigger, receive the first message based on the identification information included in the transmission trigger, call an application to be executed according to the flow definition information contained in the first message, renew the first message to a second message containing the flow definition information and a result of processing by the called application, by using the same transaction as the one in which the called application renews data to be processed by the cooperative processing, transmit the second message to a transmission addressee executing a next application, and transmit a transmission trigger indicating that the second message has been transmitted, to the transmission addressee, wherein the first message is stored in the same storage apparatus as the data renewed by the called application.

2. A computer readable, non-transitory medium storing a program for a computer having a part of plurality of applications performing a cooperative processing, wherein the program makes the computer execute the processing of recognizing that a first message, containing flow definition information for specifying an execution sequence of the plurality of applications, has been transmitted when a queue device receives a transmission trigger including identification information for identifying the first message, the transmission trigger indicating that the first message has been transmitted;

receiving the first message based on the identification information included in the transmission trigger;

calling an application to be executed according to the flow definition information contained in the first message;

renewing the first message to a second message containing the flow definition information and a result of processing by the called application, by using the same transaction as the one in which the called application renews data to be processed by the cooperative processing;

transmitting the second message to a transmission addressee executing a next application; and transmitting a transmission trigger indicating that the second message has been transmitted, to the transmission addressee, wherein the first message is stored in the same storage apparatus as the data renewed by the called application.

3. The medium according to claim 2, wherein said first message contains state management information for indicating the current position of flow, and said program makes said computer execute a processing of specifying said application to be executed according to said flow definition information and the state management information.

4. The medium according to claim 3, wherein said state management information contains information for indicating an already executed application, and said program makes said computer execute a processing of creating state management information in said second message by adding said called application to the already executed application.

5. The medium according to claim 2, wherein said flow definition information contains information for indicating a branching condition of flow, and said program makes said computer execute a processing of specifying said application to be executed according to the branching condition and a result of processing by the called application.

6. The medium according to claim 2, wherein the same storage apparatus is used for a data base.

7. An application flow control method for a computer having a part of a plurality of applications performing a cooperative processing, the application flow control method comprising:

recognizing, by using the computer, that a first message, containing flow definition information for specifying an execution sequence of the plurality of applications, has been transmitted when a queue device receives a transmission trigger including identification information for identifying the first message, the transmission trigger indicating that the first message has been transmitted;

receiving the first message, by using the computer, based on the identification information included in the transmission trigger;

calling an application to be executed, by using the computer, according to the flow definition information contained in the first message; and renewing, by using the computer, the first message to a second message containing the flow definition information and a result of processing by the called application, by using the same transaction as the one in which the called application renews data to be processed by the cooperative processing;

transmitting, by using the computer, the second message to a transmission addressee executing a next application; and transmitting, by using the computer, a transmission trigger indicating that the second message has been transmitted, to the transmission addressee, wherein the first message is stored in the same storage apparatus as the data renewed by the called application.

* * * * *